(12) United States Patent
Coscia (10) Patent No.: US 9,565,831 B1
(45) Date of Patent: Feb. 14, 2017

(54) ADAPTABLE SCOOPER WITH OPTIONAL COVER

(71) Applicant: Jippy, LLC, Morristown, NJ (US)

(72) Inventor: Robert A Coscia, Riverhead, NY (US)

(73) Assignee: Jippy, LLC, Morristown, NJ (US)

( * ) Notice: Subject to any disclaimer, the term of this patent is extended or adjusted under 35 U.S.C. 154(b) by 0 days.

(21) Appl. No.: 15/068,043

(22) Filed: Mar. 11, 2016

Related U.S. Application Data (60) Provisional application No. 62/133,088, filed on Mar. 13, 2015.

(51) Int. Cl.
*A01K 29/00* (2006.01)
*A01K 1/01* (2006.01)

(52) U.S. Cl.
CPC ............. *A01K 1/0114* (2013.01); *A01K 29/00* (2013.01)

(58) Field of Classification Search
CPC .................................................... A01K 1/0114
USPC ............. 294/51, 55.5, 59, 176, 1.3, 1.4, 1.5, 52, 294/177, 178; 56/400.04, 400.11; 119/161, 165
See application file for complete search history.

(56) References Cited

U.S. PATENT DOCUMENTS

| | | | | |
|---|---|---|---|---|
| 421,364 A * | 2/1890 | Vaag | ...................... | A01B 1/022 294/51 |
| 596,120 A * | 12/1897 | Oveson | ................... | A01B 1/022 294/51 |
| 969,307 A * | 9/1910 | Summerlin | ............ | A01B 1/022 294/51 |
| 1,050,305 A * | 1/1913 | Smith | ....................... | A01B 1/16 294/51 |
| 1,107,583 A * | 8/1914 | Burchell | ................. | A01B 1/022 294/51 |
| 1,369,262 A * | 2/1921 | Olsen | ..................... | A01B 1/022 294/51 |
| 1,442,671 A * | 1/1923 | Krehbiel | .................. | A01B 1/22 209/419 |
| 1,471,989 A * | 10/1923 | Weis | ........................ | A01D 7/02 56/400.04 |
| 3,094,348 A * | 6/1963 | Preziosi | ................... | A01G 1/12 294/55.5 |
| 3,777,708 A | 12/1973 | Vogt | | |
| 4,103,953 A | 8/1978 | Lachance | | |
| 4,222,597 A | 9/1980 | Willis | | |
| 4,249,764 A * | 2/1981 | Godeke | .................... | A01B 1/04 294/55.5 |
| 4,363,508 A | 12/1982 | Duke | | |
| 4,458,932 A | 7/1984 | Resch | | |
| 4,850,509 A * | 7/1989 | Hollenberg | .......... | B65D 5/3607 206/205 |
| 5,064,233 A * | 11/1991 | Sloan | .................... | E01H 1/1206 15/257.7 |

(Continued)

*Primary Examiner* — Paul T Chin
(74) *Attorney, Agent, or Firm* — Collard & Roe, P.C.

(57) ABSTRACT

At least one embodiment discloses a kitty litter scooper which is configured to receive at least one cover or at least one adapter. In at least one embodiment there is a scooping device comprising a handle and at least one head section. There can be at least one pusher and at least one cover wherein the cover is configured to cover over the head section. The pusher is configured to push the cover off of the head. In at least one embodiment, the pusher is configured to be coupled to the handle. In at least one other embodiment the handle extends along a longitudinal axis and the pusher is configured to slide along the handle.

16 Claims, 12 Drawing Sheets

(56) References Cited

U.S. PATENT DOCUMENTS

| | | | |
|---|---|---|---|
| 5,076,627 A * | 12/1991 | Simon | B07B 1/02 |
| | | | 209/417 |
| 5,137,316 A | 8/1992 | Foos | |
| 5,403,050 A | 4/1995 | Searing et al. | |
| 5,580,111 A | 12/1996 | Bohn | |
| 5,695,229 A * | 12/1997 | Chang | A01B 1/227 |
| | | | 294/51 |
| 5,741,036 A | 4/1998 | Ring | |
| 5,775,258 A * | 7/1998 | Larsen | A01K 1/0114 |
| | | | 119/161 |
| 5,779,290 A | 7/1998 | Wilke | |
| 6,003,915 A | 12/1999 | Bierman | |
| 6,039,370 A | 3/2000 | Dooley, Jr. et al. | |
| 6,386,606 B1 | 5/2002 | Marshall | |
| 6,485,073 B2 | 11/2002 | Harrison | |
| 6,615,752 B1 * | 9/2003 | Wang | A01O 5/02 |
| | | | 111/95 |
| 6,869,118 B2 | 3/2005 | Bradford | |
| 6,928,956 B2 | 8/2005 | Parr | |
| 7,047,907 B1 | 5/2006 | Johnston | |
| 7,237,814 B2 | 7/2007 | Handzlik | |
| 7,267,381 B2 | 9/2007 | Cafferty et al. | |
| 7,431,361 B2 | 10/2008 | Pilas | |
| 7,523,973 B2 | 4/2009 | Lin et al. | |
| 7,559,591 B1 | 7/2009 | DeSanti | |
| 7,950,707 B1 | 5/2011 | Lapolla | |
| 2002/0096895 A1 | 7/2002 | McCarthy | |
| 2002/0167184 A1 * | 11/2002 | May | E01H 1/1206 |
| | | | 294/1.4 |
| 2004/0227364 A1 | 11/2004 | Pain et al. | |
| 2009/0199778 A1 * | 8/2009 | Kratzer | A01K 1/0107 |
| | | | 119/165 |

* cited by examiner

ADAPTABLE SCOOPER WITH OPTIONAL COVER

CROSS REFERENCE TO RELATED APPLICATIONS

This application is a non-provisional application that hereby claims priority from provisional application Ser. No. 62/133,088 filed on Mar. 13, 2015, the disclosure of which is hereby incorporated by reference in its entirety.

BACKGROUND

At least one embodiment of the invention relates to a kitty litter scooper which is configured to receive a plurality of different covers or adapters. What is not known is a kitty litter scooper that is fully adjustable with an easily removable cover and which is adaptable for multiple uses.

SUMMARY

At least one embodiment of the invention relates to a kitty litter scooper which is configured to receive at least one cover or at least one adapter.

In at least one embodiment there is a scooping device comprising a handle and at least one head section. There can be at least one pusher and at least one cover wherein the cover is configured to cover over the head section. The pusher is configured to push the cover off of the head.

In at least one embodiment, the pusher is configured to be coupled to the handle.

In at least one other embodiment the handle extends along a longitudinal axis and the pusher is configured to slide along the handle.

In at least one embodiment the handle has a channel which is configured to receive the pusher.

In at least one embodiment the pusher is substantially T-shaped with the pusher having a longitudinal extension extending along a longitudinal extension of the handle.

In at least one embodiment the pusher has a latitudinal extension extending substantially transverse to the longitudinal extension of the pusher, wherein the latitudinal extension is positioned adjacent to the head when the pusher is in a retracted position.

In at least one embodiment the head has a base section adjacent to the handle and a head section disposed at a distal end from the base section of the head.

In at least one embodiment the head has a plurality of fingers wherein at least one finger is shaped with a substantially triangular cross-section such that a base of the finger which is adjacent to the base of said head is thicker than a head of the finger which is adjacent to said head section of the head.

In at least one embodiment the cover is configured to fit over the head in a friction fit manner.

In at least one embodiment, the head further comprises at least one protrusion which is configured to intersect at least one indent on the cover to secure the cover to the head when the cover is pressed onto the head.

In at least one embodiment the head further comprises side walls and wherein the protrusion is positioned on at least one of the side walls of the head.

In at least one embodiment, the head has a back wall, a plurality of side walls and a plurality of fingers.

In at least one embodiment the cover has a head end, and a base end, wherein the base end comprises a flap, wherein when the base end is positioned adjacent to the base section of the head when the cover is on the head, and wherein the flap extends over the back wall of the head when the cover is in a secured position.

Thus, this design is configured to provide a sanitary system which allows for easy cleanup of a kitty litter box using covers that can be easily disposable. These covers can be made from any suitable material and can be made from biodegradable material.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1A is a top back perspective view of a first embodiment with a cover half on;

FIG. 2A is a side view of the embodiment of FIG. 1A with the cover half on;

FIG. 3A is a top view of the embodiment of FIG. 1A with the cover half on;

FIG. 5 is a back perspective view of the embodiment with the cover on;

DETAILED DESCRIPTION

Figure 1A:
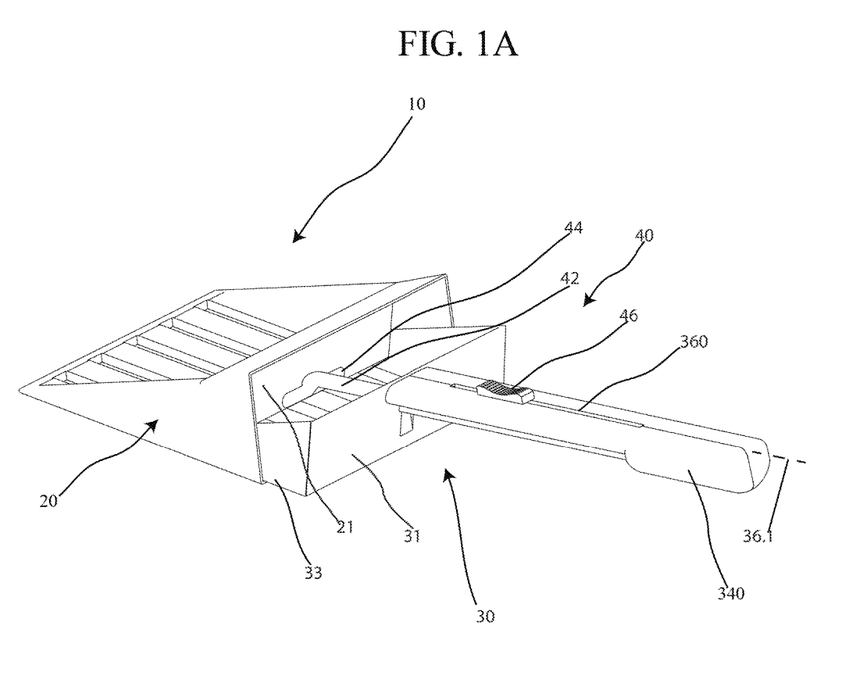

Referring in detail to the drawings, FIG. 1A is a side back perspective view of a first embodiment of the device 10. Device 10 is a scooper device, which comprises a cover 20, a base 30, and a pusher 40. Base 30 includes a head 31, the head having at least one side face or finger 33, and a handle 340. Along the longitudinal axis of handle 340 is a slot 360. A pusher 40 is slidable along the longitudinal axis of handle 340 with pusher arm 42 selectively extending out from handle 340. Coupled to one end of pusher arm 42 is a pusher plate 44. Pusher plate 44 pusher plate 44 and pusher arm 42 form a T-shaped pusher which is configured to push against a back face 21 of cover 20. Pusher plate 44 extends down at an angle from pusher arm 42. Thus, pusher plate 44 extends down from pusher arm 42 to push a bottom section of back face 21. At an opposite end is a push a button 46 coupled to pusher arm 42. Pusher button 46 is slidable along slot 360 and is configured in a substantially V-shaped cross-section and is configured to receive a finger such as a thumb to drive pusher 40 along the longitudinal axis 36.1 of handle 340. In addition, the cover 20 can be made from any suitable materials such as paper, plastic, composite, cardboard, metal or any other suitable material. Similarly the base can be made from any suitable material as well such as plastic, paper, cardboard, metal or a composite. Thus, the system is designed to provide a sanitary means for cleaning a kitty litter tray or any other suitable tray using suitable materials. For example, the cover 20 can be made from biodegradable materials which allow for easy disposal.

Figure 1B:
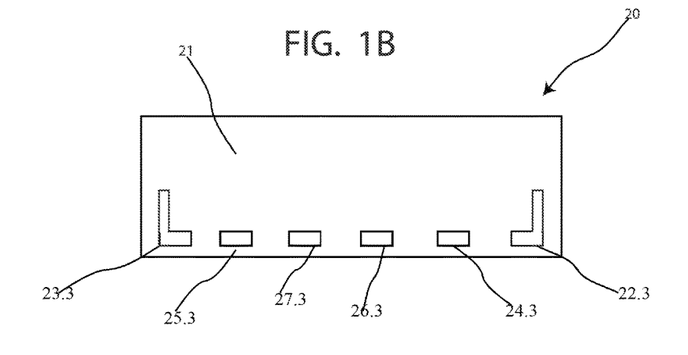
FIG. 1B is a back view of a cover.

FIG. 1B is a back view of a cover. This back view of cover 20 includes back face 21 which shows channels 22.3, 24.3, 26.3, 23.3, 25.3 and 27.3 which are configured to receive each of the individual fingers 32, 34, 36, 33, 35, 37 shown in FIG. 6A. Thus each of these channels completely surround the fingers on five sides thereby keeping the fingers free from waste.

Figure 2A:
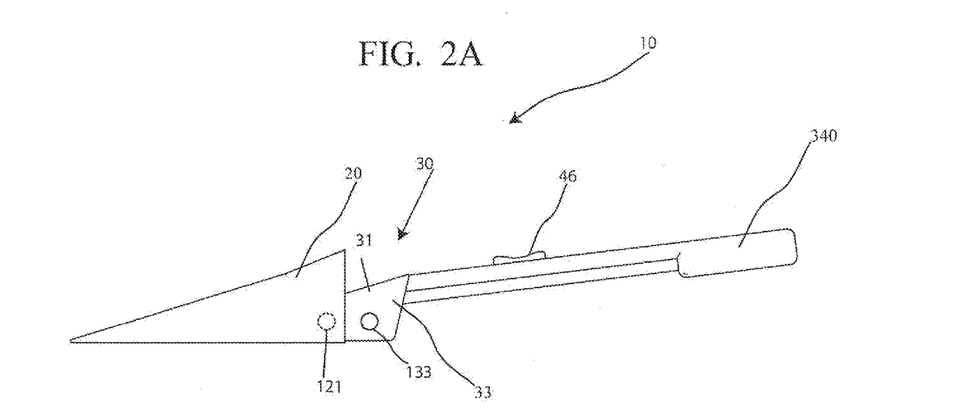

FIG. 2A shows a side view of scooper device 10. In this view, cover 20 is shown as partially off or half off of head section 31 of base 30. In addition, coupled to cover 20 is a indent or detent 121 which is shown in dashed lines because this is positioned on an inside face of cover 20. On side finger 33 of base section 30 is a indent or detent 133, which is complementary to the indent or detent 121. Indent or detent 121 and indent or detent 133 are configured to complement each other so that when cover 20 is slid fully onto base 30. It snaps over indent or detent 133 with indent or detent 121 mating with indent or detent 133. Thus, this combination forms a locking connection for indent or detent 133 with indent or detent 121. In addition, in this side view, pusher button 46 is shown with its V-shaped cross-section which is slidable along handle 340.

Thus, in one embodiment, element 121 is an indent and element 133 is a detent. In another embodiment, element 121 is a detent and element 133 is an indent.

Figure 2B:
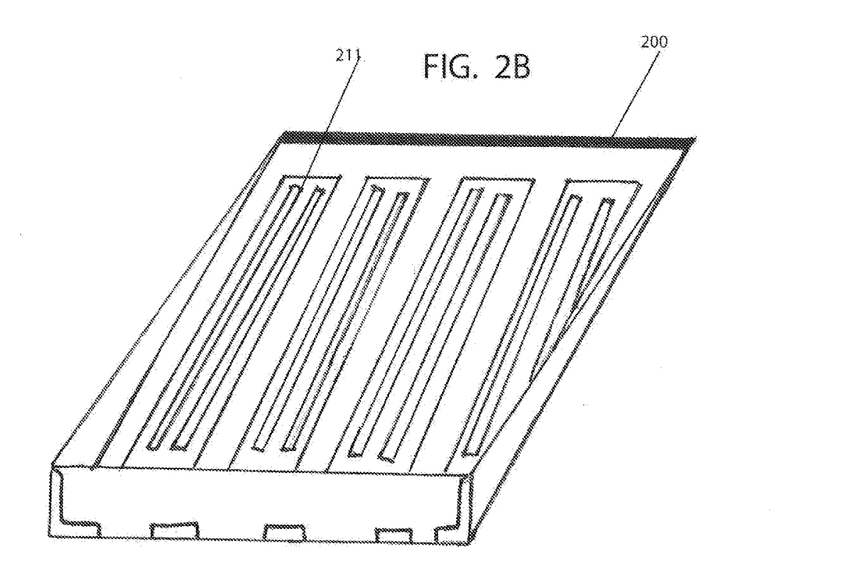
FIG. 2B is a perspective back view of another embodiment of a cover.

FIG. 2B shows another embodiment of a cover 200 which has additional fingers 211 disposed therein. These additional fingers can create a different set of spacing for removing cat waste or kitty litter.

For purposes of this application, the fingers associated with cover 20 such as fingers 22, 24, 26, 23, 25, and 27 are essentially cover fingers, while the fingers 32, 34, 36, 33, 35, 37 associated with the head section 31 of the base 30 are essentially base fingers.

Thus, the fingers such as fingers 22, 24, 26, or 23, 25 or 27 can be spaced apart from each other at different distances depending on the suitable design.

Figure 3A:
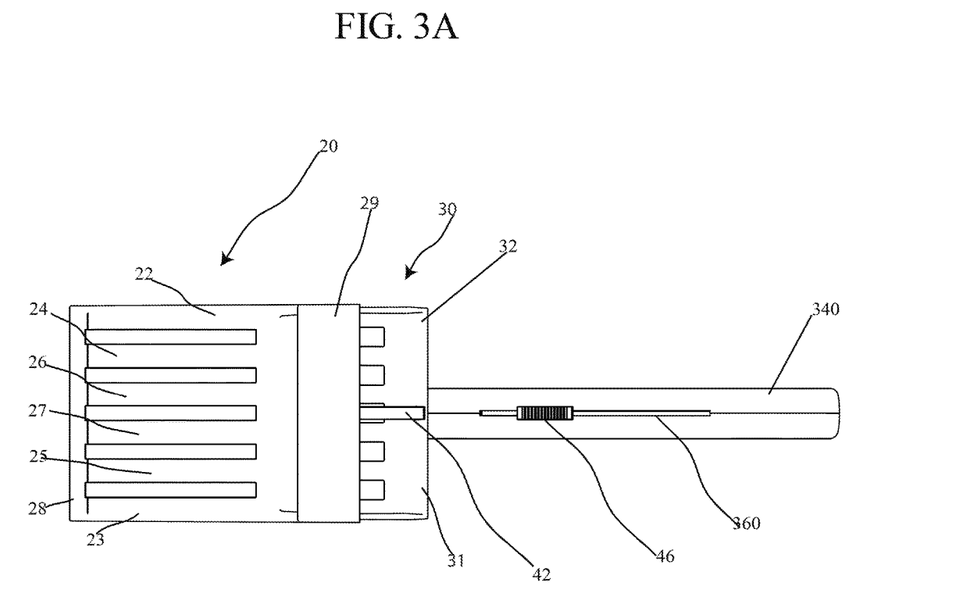

FIG. 3A. is a top view of this embodiment. 10. In this view, there is shown cover 20 having a plurality of fingers, 22, 24, 26, 23, 25, 27, with these fingers being coupled to an end plate 28. Side fingers 22 and 23 have side walls as well. In addition, there is a top face 29 for cover 20. There is shown base head section 31 coupled to handle 340 with slot 360 extending along the longitudinal axis of handle 340. Pusher button 46 is shown slidable along slot 360 with pusher arm 42 extending out from handle 340 in the region of base head section 31.

Figure 3B:
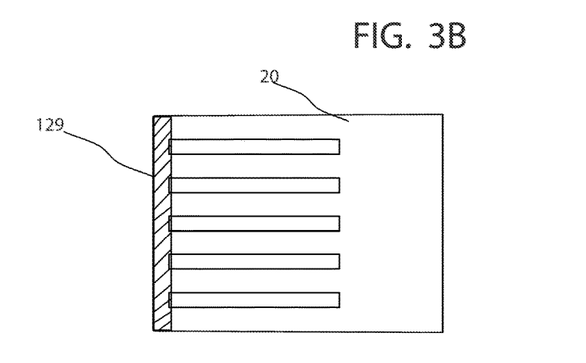
FIG. 3B is a bottom side view of the cover.

FIG. 3B is a bottom view of the cover with a pad 129 disposed thereon. The pad 129 is for optionally scrubbing the kitty litter tray or other parts. The pad can be in the form of a scrub pad.

Figure 4:
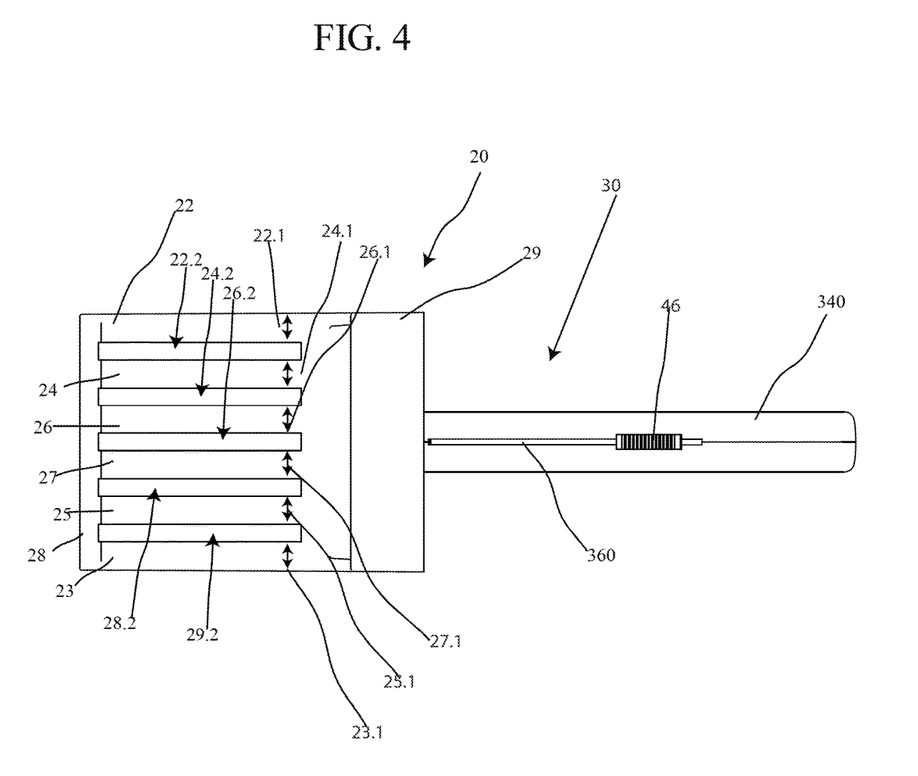
FIG. 4 is a top view of the embodiment of FIG. 1A with the cover on the device.

FIG. 4 shows a top view with the cover fully on. In this view, there is shown fingers 22, 24, 26, 23, 25, and 27, all coupled to end plate 28. At a base end of fingers, are widened sections 22.1, 24, 0.1, 26.1, 23.1, 25.1, and 27.1. These widened sections are configured to receive associated fingers on base section 30, which are shown in greater detail in FIG. 7. The fingers of base section 30 (see FIG. 6A) also selectively widened in a substantially triangular-shaped cross section such that the when the cover is pressed on, it's slowly snug fits onto the wider base end portions of the respective fingers. Disposed between these fingers are slots. For example, there are slots 22.2, 24.2, 26.2, 29.2, 28.2. The slots allow kitty litter to fall through the slots and back into a tray while trapping any excrement from a animal such as a cat.

Figure 5:
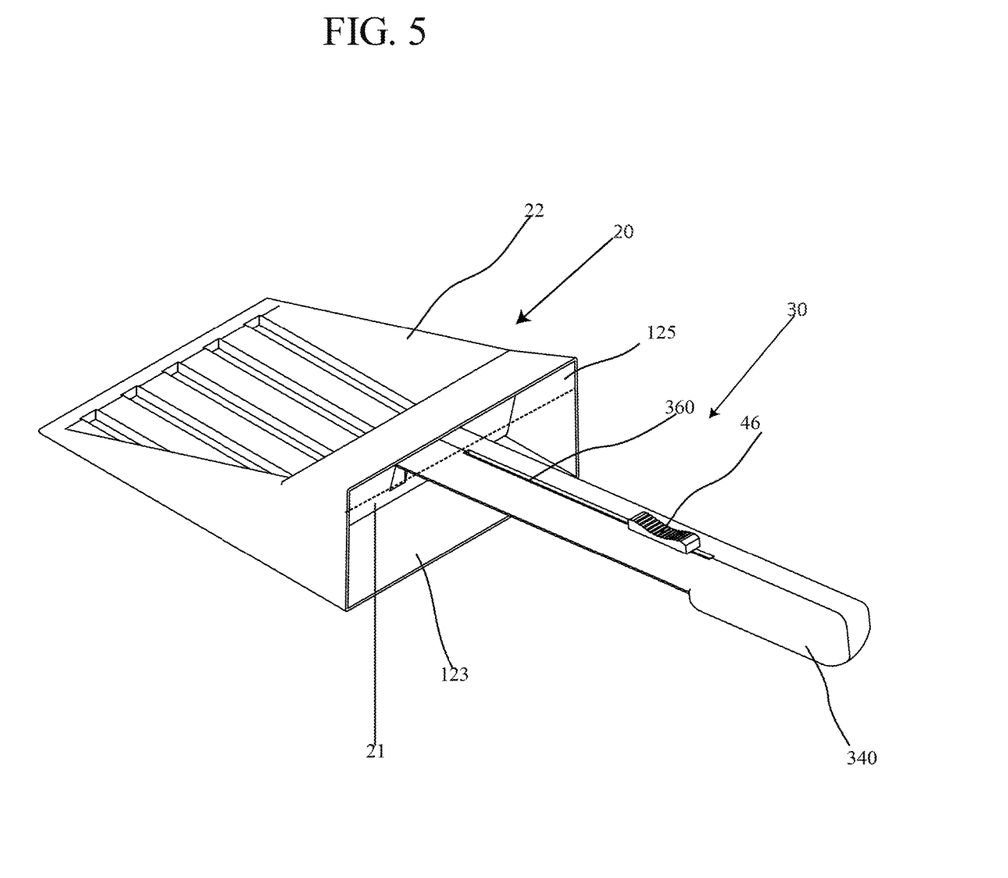

FIG. 5 shows a back side perspective view which shows back face 21 of cover 20, inside face 123 of cover 20, optional flap 125 of cover 20, as well as handle 340, slot 360, and pusher button 46. Flap 125 can selectively fold over a back face 39 (see FIG. 6A) on base 30 when the cover is pushed on. Thus, flap 125 can be configured to selectively secure cover 20 to base 30.

Figure 6A:
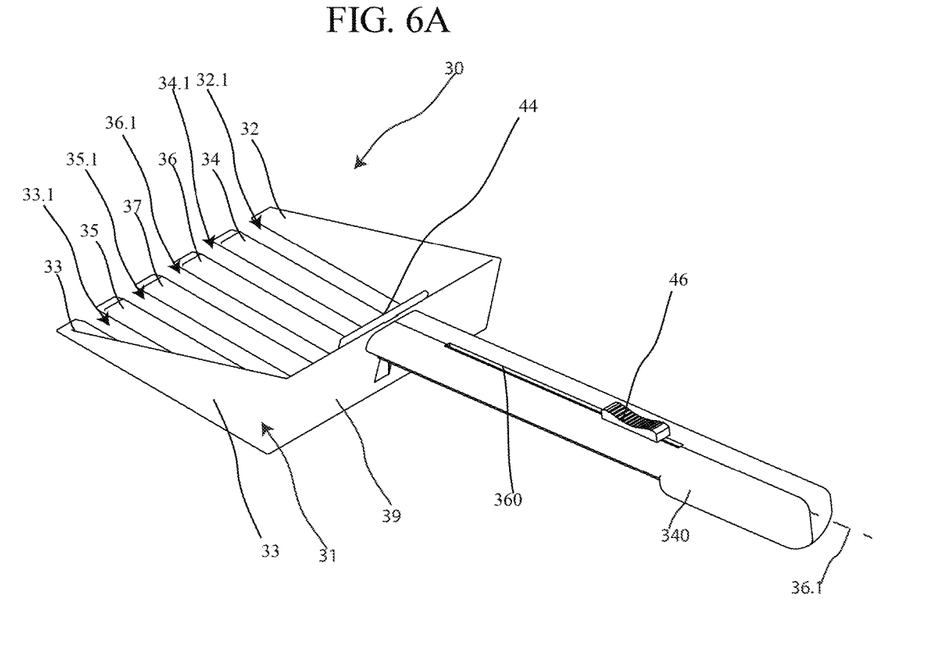
FIG. 6A is a top-back perspective view with the cover off.

FIG. 6A shows a uncovered view of base 30. In this view, base 30 includes head section 31, and handle section 340, wherein handle section 340 is coupled head section 31. As shown, there is a slot 360 extending along a longitudinal axis 36.1, with pusher button 46 slidable along slot 360. There is also shown pusher plate 44 extending transverse or substantially perpendicular to this longitudinal axis 36.1 In addition, there is shown a plurality of fingers extending out a head section of base 30. For example, there is shown fingers 32, 34, 36, as well as fingers 33, 35, and 37. These fingers are spaced apart from each other by slots 32.1, 34.1, 36.1, 33.1, and 35.1. Head section 31 has side walls which are part of respective fingers 32 and 33, wherein these sidewalls extend substantially perpendicular to the faces of the extending respective fingers 32 and 33.

Figure 6B:
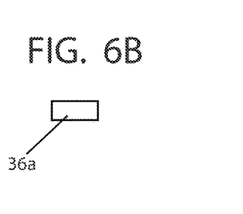
FIG. 6B is an end view of a finger.
Figure 6C:
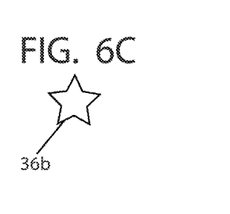
FIG. 6C is an end view of a finger.
Figure 6D:
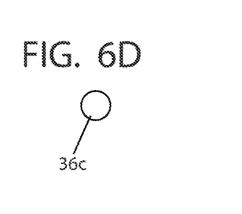
FIG. 6D is an end view of a finger.

FIG. 6B shows an end view of a finger 36a having a substantially square or substantially rectangular cross-section. FIG. 6C shows an end view of a finger 36b having a substantially star shaped cross section. FIG. 6D shows an end view of a finger 36c having a substantially round shaped cross-section. Other cross-sectional shapes are also available such as triangular, oval, or other suitable designs.

Figure 7:
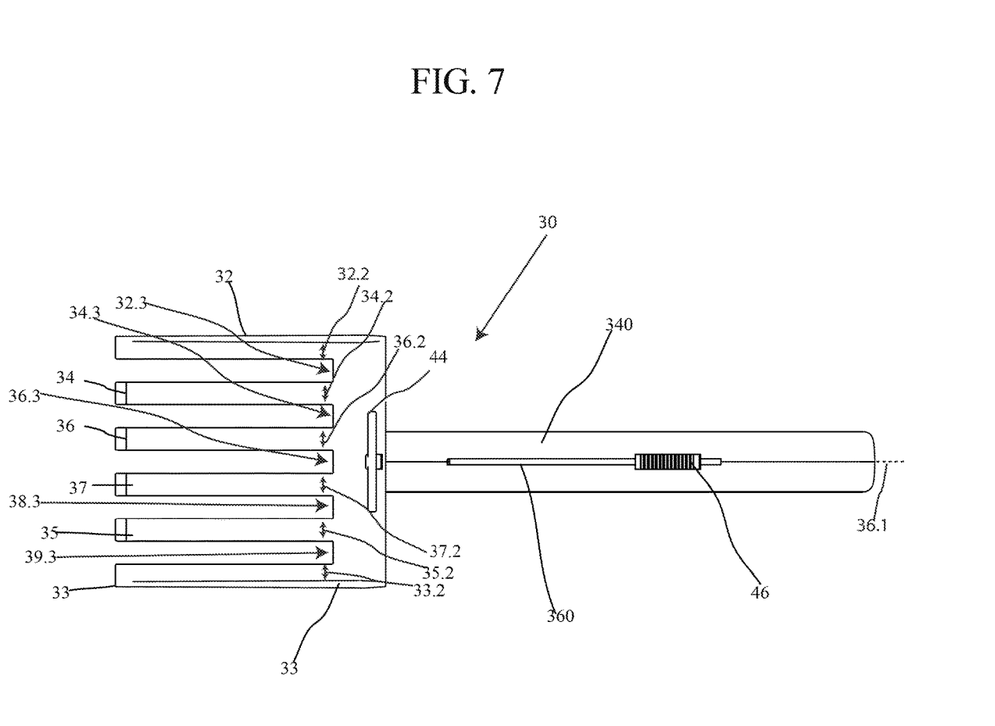
FIG. 7 is a top view with the cover off.

Ultimately the system is designed so that the base, particularly the fingers of the head section such as fingers 32, 34, 36, 33, 35 and 37 shown in FIG. 7 are not bound together at their ends positioned away from the handle section 340. Thus, a cover having individual channels such as channels 22.3. 24.3 26.3, 23.3, 25.3, and 27.3 shown in FIG. 1B which entirely encircle the fingers 32, 34, 36, 33, 35 and 37 so that the fingers can remain entirely clean.

FIG. 7 shows a top view of this base section 30. As such, there is shown handle section 340, which include slot 360. Push button 46 is slidable along slot 360 on longitudinal axis the 36.1. In addition, as shown with fingers 32, 34, 36, 33, 35, and 37, each of these fingers has in a base section a wider expansion then at the head section. For example, this wider extension creates a substantially but only slightly noticeable triangular cross section which allows for a thicker or wider extension at sections 32.2, 34.2, 36.2, 37.2, 35.2, and 33.2. These wider expansions allow for a increasingly selective friction fit for cover 20. In particular, for the base sections of respective fingers 22, 24, 26, 23, 25, and 27 shown in FIG. 4. For example, when cover 20 is being put on, base sections 22.1, 24.1, 26.1, 23.1, 25.1, and 27.1, slowly received base sections 32.2, 34.2, 36.2, 33.2, 35.2, and 37.2, to slowly friction fit onto head section 31 of base 30 shown in FIG. 7.

Figure 8:
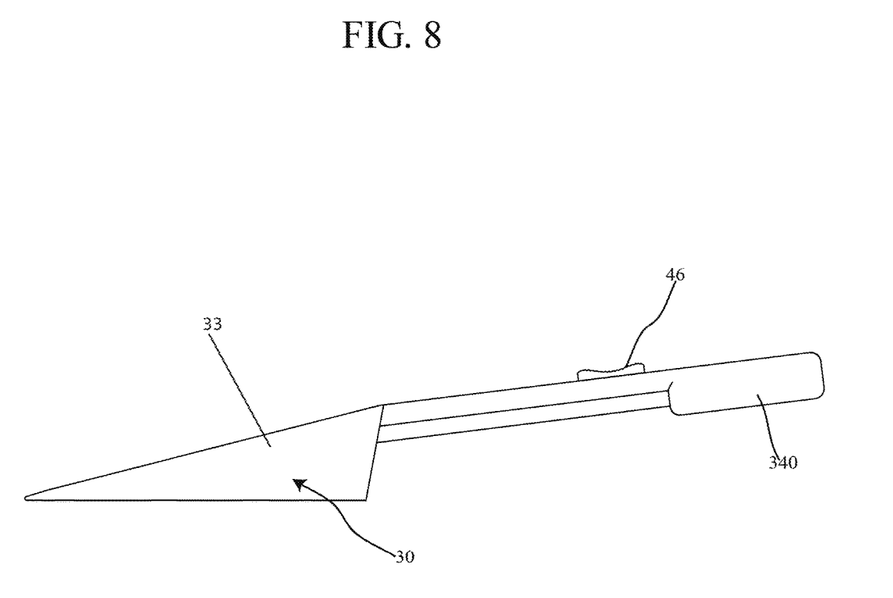
FIG. 8 is a side view with the cover off.

FIG. 8. This is a side view of base section 30 with handle extension 340 and pusher button 46 being shown. This view shows the extension of sidewall 33, which extends in a manner substantially vertical when the handle is placed flat on the ground.

Figure 9A:
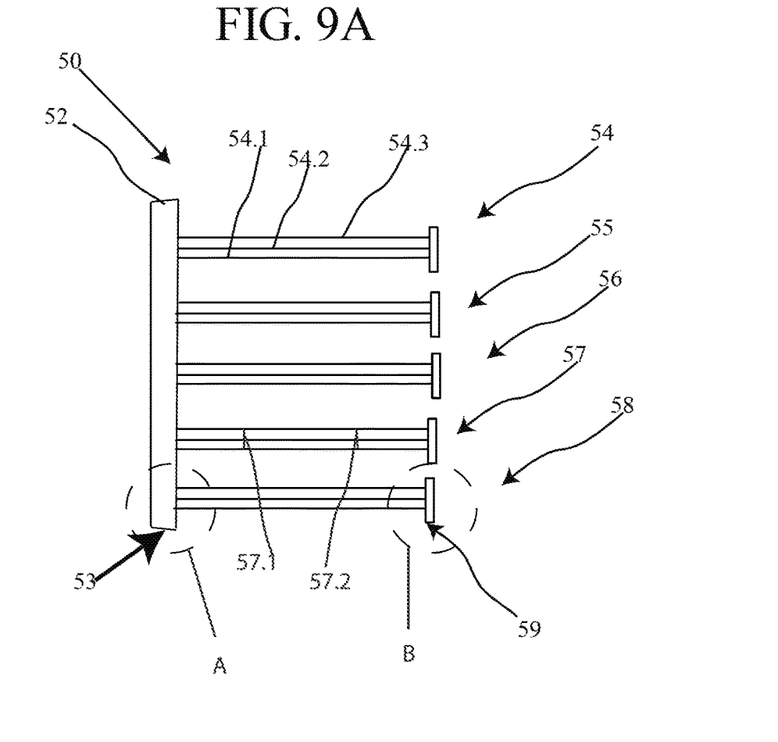
FIG. 9A is a top view of an adapter.

FIG. 9A shows a top view of an adapter 50 which is configured to be fit onto base section 30 without cover 20. For example, adapter 50 includes adapter head plate 52 which is coupled to a plurality of adapter extensions 54, 55, 56, 57, and 58. Each of these adapter extensions has adapter prongs such as adapter prongs 54.1, 54.2, 54.3. Each of these prongs is spaced apart by a gap which allows for material such as kitty litter to fall through while still allowing the entire device to serve as a kitty litter scooper. Thus, with this adapter, the device can be used without a cover or to use different sized adapters for different kinds of litter. To stabilize each of the adapter extension, there can be cross braces 58.1 and 58.2 which an extend transverse to prongs such as prongs 54.1, 54.2, or 54.3. Any one of these adapter extensions can be at a different elevation or height than the associated fingers 22, 24, 26, or 23, 25 27.

Figure 9B:
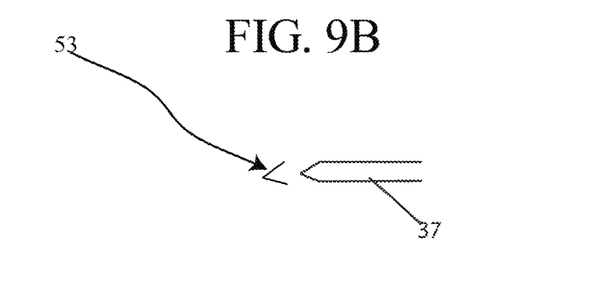
FIG. 9B is a side view of an interface for the adapter taken in region A.
Figure 9C:
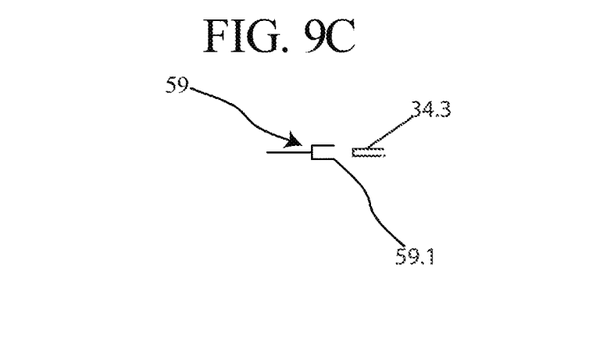
FIG. 9C is a side view of another interface for the adapter taken in region B.

Sections 53 and 59 of adapter 50 are shown in greater detail in FIGS. 9B and 9C. For example, FIG. 9B shows a side view of section 53, which shows a substantially triangular cross section. This substantially triangular cross section is configured to selectively fit over head prong sections of fingers 32, 34, 36, 33, 35, and 37. Thus, this triangular cross section allows for a snug friction fit of the prong ends of these particular fingers. FIG. 9C shows a side cross-sectional view of section 59. Side cross-sectional view of this section 59 shows that they include an adapter section 59.1 which is configured as a substantially U-shaped female adapter which is configured to receive base sections 32.3, 34.3, 36.3, 38.3, and 39.3, of base 30 (See FIG. 7). This connection is in a friction fit manner to snap into these base sections.

Figure 10:
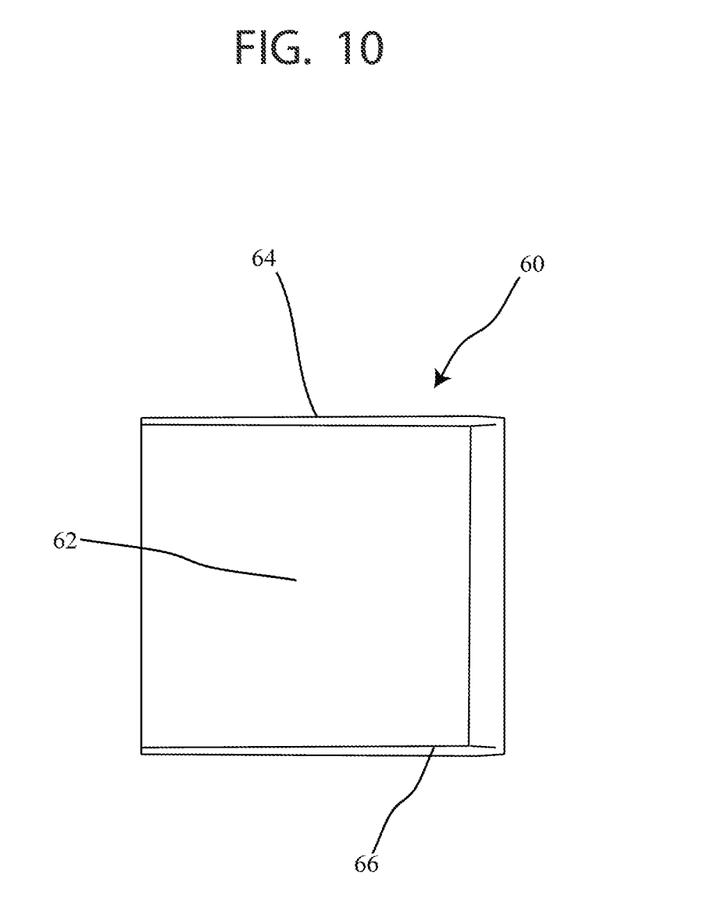
FIG. 10 is a top view of a cover to make the scooper a full scoop.

FIG. 10 shows a top view of a shovel adapter 60 which includes sidewall 64 and 66, as well as a solid flat plate 62. This shovel adapter 60 is configured to snap over or slide over base section 32 form a complete solid shovel with no slots or slats disposed therein. Thus, the device can serve as a kit with covers 20, adapter 50, or shovel adapter 60 being slidable on a base section 30. Thus, the device is therefore completely adaptable for any particular use.

Figure 11:
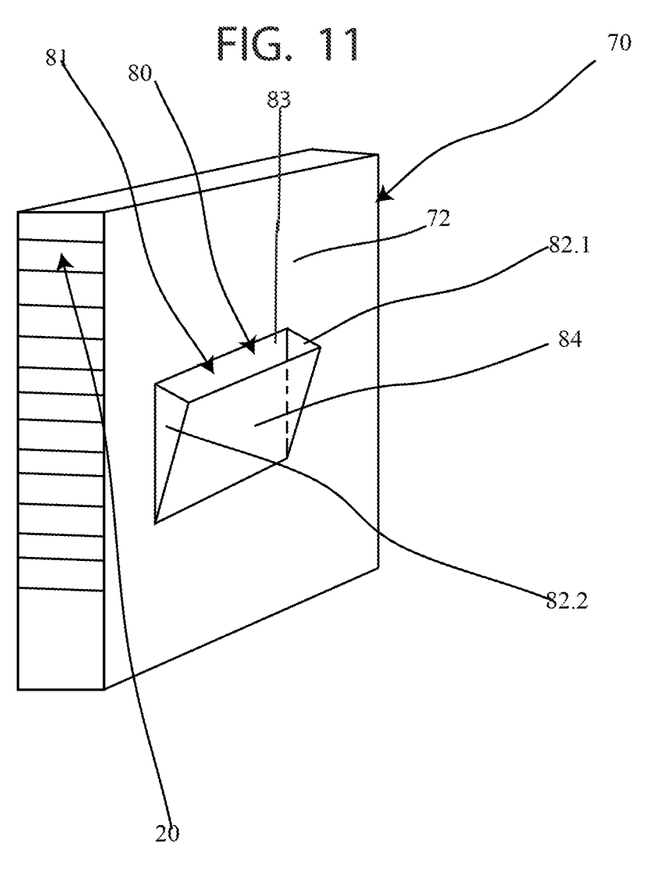
FIG. 11 is a perspective view of a box for holding at least one cover and for holding the scooper.

FIG. 11 shows a side perspective view of a box 70 for retaining both covers 20, as well as providing for a side pouch 80 for receiving a base 30. Side pouch 80 includes a top opening 81 with sidewalls 82.1, and 82.2. In addition, there is also a back wall 83 and a front wall 84. Back wall 83 is coupled to sidewall 72, of box 70. Base 30 is then slidable into opening 81 of side pouch 80 so that the base handle can then rest in this section when not in use.

Figure 12:
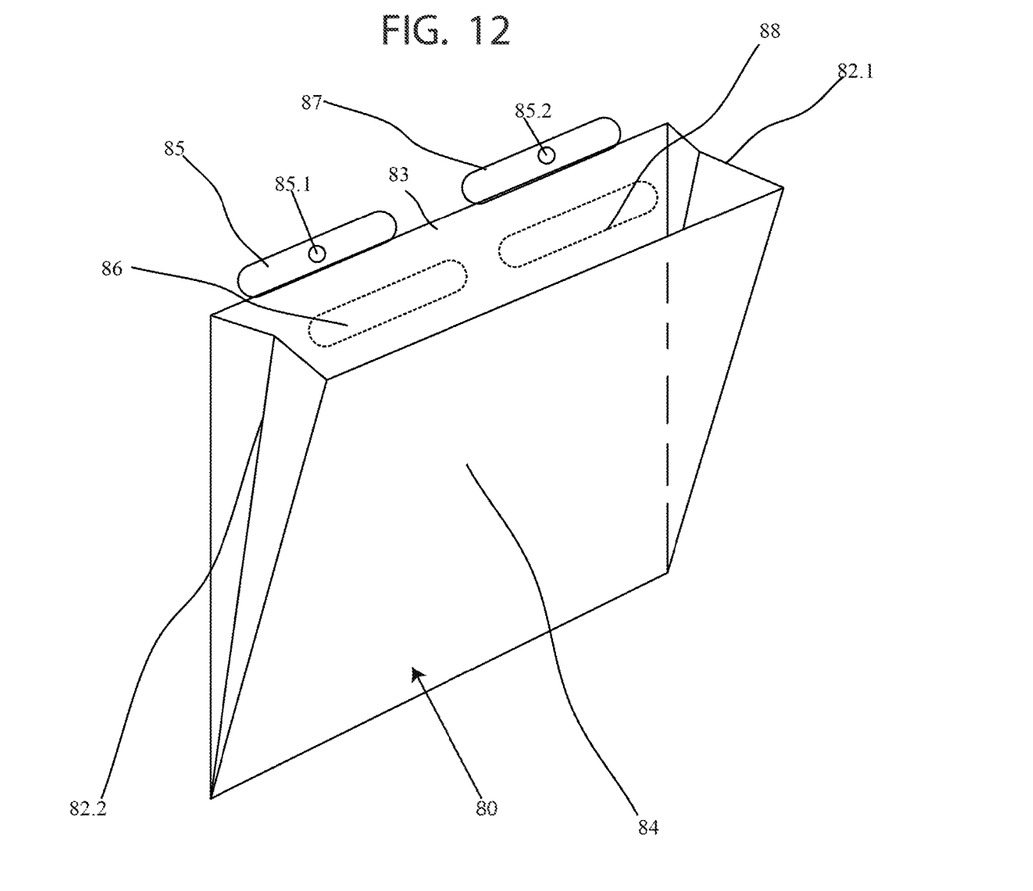
FIG. 12 is a perspective view of a holder of said box mounted on a wall.

FIG. 12 shows side pouch 80 which is configured to be mounted on a wall. The pouch can be a sanitary pouch which can optionally have a scent infused therein for sanitary purposes. For example, there are a plurality of back tabs 85 and 87 which each can have drill holes 85.1, and 85.2. Tabs 85 and 87 are selectively coupled to the back wall 83. These tabs allow for the mounting of this side pouch 80 on a wall separate from box 70. Alternatively, side pouch 80 can be mounted via double-sided tape or adhesive 86 and 88, such that double-sided adhesive 86 and 88 can be then be adhered to a wall to secure the pouch in place. Thus, the side pouch can then be opened with sidewalls 82.1, and 82.2 being accordion shape to allow for opening of the pouch. This pouch can also be attached to a box of kitty litter or a any other suitable surface. This pouch is configured to receive a paper bag shaped to fit the pouch so it is held in place when receiving feces.

Thus, this device is designed for multiple different uses, but ultimately for the clean and efficient and sanitary use of a scooper such as kitty litter scooper for cleaning kitty litter out of a tray.

Accordingly, while at least one embodiment of the present invention has been shown and described, it is obvious that many changes and modifications may be made thereunto without departing from the spirit and scope of the invention.

What is claimed is:

1. A scooping device comprising:
   a) a handle;
   b) at least one head section coupled to said handle said head section comprising a plurality of fingers;
   c) at least one pusher coupled to said handle;
   d) at least one cover having channels wherein said at least one cover is configured to cover over said at least one head section such that each of these channels completely surround the fingers on five sides; and
   wherein said at least one pusher is configured to push said at least one cover off of said head section.

2. The scooping device as in claim 1, wherein said pusher is configured to be coupled to said handle.

3. The scooping device as in claim 1, wherein said handle extends along a longitudinal axis and said pusher is configured to slide along said longitudinal axis of said handle.

4. The scooping device as in claim 1, wherein said handle has a channel which is configured to receive said at least one pusher.

5. The scooping device as in claim 1, wherein said pusher is substantially T-shaped with said pusher having a longitudinal extension extending along a longitudinal extension of said handle.

6. The scooping device as in claim 5, wherein said pusher has a latitudinal extension extending substantially transverse to said longitudinal extension of said pusher, wherein said latitudinal extension is positioned adjacent to said head when said pusher is in a retracted position.

7. The scooping device as in claim 1, wherein said at least one head has a base section adjacent to said handle and a head section disposed at a distal end from said base section of said head.

8. The scooping device as in claim 1, wherein said head has a plurality of fingers.

9. The scooping device as in claim 1, wherein said at least one finger of said plurality of fingers is shaped with a substantially triangular cross-section such that a base of said finger which is adjacent to said base of said head is thicker than a head of said finger which is adjacent to said head section of said head.

10. The scooping device as in claim 1, wherein said at least one cover is configured to fit over said head in a friction fit manner.

11. The scooping device as in claim 10, wherein said head further comprises at least one protrusion which is configured to intersect at least one indent on said at least cover to secure said at least one cover to said head when said at least one cover is pressed onto said head.

12. The scooping device as in claim 11, wherein said head further comprises side walls and wherein said at least one protrusion is positioned on at least one of said side walls of said head.

13. The scooping device as in claim 10 wherein said head has a back wall, a plurality of side walls and a plurality of fingers.

14. The scooping device as in claim 10, wherein said at least one cover has a head end and a base end, wherein said base end comprises a flap, wherein when said base end is positioned adjacent to said base section of said head when said at least one cover is on the head, and wherein said at least one flap extends over said back wall of said head when said at least one cover is in a secured position.

15. The scooping device as in claim 1, wherein said at least one cover is made from paper.

16. The scooping device as in claim 1, wherein the cover is made from a plastic material.

\* \* \* \* \*